(12) United States Patent
Steele

(10) Patent No.: US 7,265,663 B2
(45) Date of Patent: Sep. 4, 2007

(54) MULTIMEDIA RACING EXPERIENCE SYSTEM

(75) Inventor: Robert C. Steele, Fairfax, VA (US)

(73) Assignee: Trivinci Systems, LLC, Sterling, VA (US)

( * ) Notice: Subject to any disclaimer, the term of this patent is extended or adjusted under 35 U.S.C. 154(b) by 1069 days.

(21) Appl. No.: 10/278,132

(22) Filed: Oct. 22, 2002

(65) Prior Publication Data

US 2003/0130822 A1  Jul. 10, 2003

Related U.S. Application Data

(60) Provisional application No. 60/333,499, filed on Nov. 28, 2001.

(51) Int. Cl.
*G08B 1/00* (2006.01)
(52) U.S. Cl. .................... 340/531; 340/534; 340/539.1; 340/539.12; 340/426.25; 701/28; 701/45; 701/46
(58) Field of Classification Search ............... 340/531, 340/534, 539.1, 539.12, 426.25; 701/28, 701/45, 46
See application file for complete search history.

(56) References Cited

U.S. PATENT DOCUMENTS

| | | | |
|---|---|---|---|
| 3,591,931 A | 7/1971 | Schuster | 434/69 |
| 4,380,024 A | 4/1983 | Olofsson | 358/93 |
| 4,551,801 A | 11/1985 | Sokol | |
| 4,855,822 A | 8/1989 | Narendra et al. | |
| 4,876,592 A | 10/1989 | Von Kohorn | 358/84 |
| 4,912,556 A | 3/1990 | Hirauchi et al. | 358/162 |
| 4,941,182 A | 7/1990 | Patel | 382/1 |
| 5,068,646 A | 11/1991 | Baker | 340/725 |
| 5,166,681 A | 11/1992 | Bottesch et al. | 340/933 |
| 5,173,856 A | 12/1992 | Purnell et al. | |
| 5,184,956 A | 2/1993 | Langlais et al. | |
| 5,227,803 A | 7/1993 | O'Connor | 342/442 |
| 5,240,416 A | 8/1993 | Bennington | |
| 5,277,584 A | 1/1994 | DeGroat et al. | |
| 5,281,947 A | 1/1994 | Durley et al. | 340/433 |
| 5,281,949 A | 1/1994 | Durley et al. | 340/433 |
| 5,309,140 A | 5/1994 | Everett, Jr. et al. | 340/466 |
| 5,320,351 A | 6/1994 | Suzuki | |
| 5,325,082 A | 6/1994 | Rodriguez | |

(Continued)

FOREIGN PATENT DOCUMENTS

EP  0290364 A1  11/1988

(Continued)

OTHER PUBLICATIONS

"Stack motorsport instrumentation and data logging"; reprinted from http://www.stackinc.com printed on May 20, 2004, 12 pages.

(Continued)

*Primary Examiner*—Tai Nguyen
(74) *Attorney, Agent, or Firm*—Peter A. Balnave, Esq.

(57) ABSTRACT

A multimedia racing experience system is provided including a plurality of input devices, such as cameras, microphones, and telemetry sensors. All input devices communicate with an on-vehicle processing unit for multiplexing the input data into a data stream. The data stream is then transferred to a central location for display or recording on playback media.

30 Claims, 8 Drawing Sheets

U.S. PATENT DOCUMENTS

| | | |
|---|---|---|
| 5,366,376 A | 11/1994 | Copperman et al. .......... 434/69 |
| 5,396,429 A | 3/1995 | Hanchett .................... 364/436 |
| 5,493,269 A | 2/1996 | Durley et al. ............... 340/433 |
| 5,495,576 A | 2/1996 | Ritchey ....................... 395/125 |
| 5,499,182 A | 3/1996 | Ousborne |
| 5,539,330 A | 7/1996 | McDermid .................. 326/39 |
| 5,574,426 A | 11/1996 | Shisgal et al. ............. 340/345 |
| 5,600,558 A | 2/1997 | Mearek et al. |
| 5,618,179 A | 4/1997 | Copperman et al. .......... 434/69 |
| 5,627,952 A | 5/1997 | Silverbrook ................ 395/135 |
| 5,633,946 A | 5/1997 | Lachinski et al. .......... 382/103 |
| 5,666,101 A | 9/1997 | Cazzani et al. |
| 5,689,442 A | 11/1997 | Swanson .................... 364/550 |
| 5,696,706 A | 12/1997 | Morton et al. .............. 702/142 |
| 5,707,237 A | 1/1998 | Takemoto et al. |
| 5,729,471 A | 3/1998 | Jain et al. ............... 364/514 A |
| 5,765,116 A | 6/1998 | Wilson-Jones et al. ....... 701/41 |
| 5,813,993 A | 9/1998 | Kaplan et al. ............... 600/544 |
| 5,821,947 A | 10/1998 | Nguyen ....................... 345/473 |
| 5,835,008 A | 11/1998 | Colemere, Jr. ............. 340/439 |
| 5,841,432 A | 11/1998 | Carmel et al. .............. 345/302 |
| 5,850,352 A | 12/1998 | Moezzi et al. .......... 364/514 A |
| 5,857,159 A | 1/1999 | Dickrell et al. |
| 5,865,624 A | 2/1999 | Hayashigawa |
| 5,887,243 A | 3/1999 | Harvey ....................... 455/3.1 |
| 5,899,956 A | 5/1999 | Chan ........................... 701/213 |
| 5,901,978 A | 5/1999 | Breed et al. ............... 280/73.5 |
| 5,919,045 A | 7/1999 | Tagge et al. .................. 343/62 |
| 5,921,780 A | 7/1999 | Myers |
| 5,961,571 A | 10/1999 | Gorr et al. .................. 701/207 |
| 5,969,770 A | 10/1999 | Horton ....................... 348/569 |
| 5,983,161 A | 11/1999 | Lemelson et al. .......... 701/301 |
| 6,055,468 A | 4/2000 | Kaman et al. ................ 701/29 |
| 6,067,488 A | 5/2000 | Tano |
| 6,116,639 A | 9/2000 | Breed et al. ............... 280/73.5 |
| 6,154,658 A | 11/2000 | Caci ........................... 455/466 |
| 6,157,317 A | 12/2000 | Walker .................. 340/825.44 |
| 6,161,071 A | 12/2000 | Shuman et al. .............. 701/48 |
| 6,198,996 B1 | 3/2001 | Bertis .......................... 701/36 |
| 6,223,237 B1 | 4/2001 | McDermid .................. 701/127 |
| 6,226,031 B1 | 5/2001 | Barraclough et al. .... 348/14.13 |
| 6,237,415 B1 | 5/2001 | Konno et al. ............. 73/504.16 |
| 6,246,933 B1 | 6/2001 | Bague .......................... 701/35 |
| 6,252,544 B1 | 6/2001 | Hoffberg |
| 6,262,764 B1 | 7/2001 | Perterson .................... 348/148 |
| 6,275,773 B1 | 8/2001 | Lemelson et al. .......... 701/301 |
| 6,298,723 B1 | 10/2001 | Konno et al. ............. 73/504.16 |
| 6,324,453 B1 | 11/2001 | Breed et al. .................. 701/45 |
| 6,352,478 B1 | 3/2002 | Gabai et al. ................. 463/42 |
| 6,361,321 B1 | 3/2002 | Huston et al. ................ 434/69 |
| 6,393,348 B1 * | 5/2002 | Ziegler et al. ................ 701/45 |
| 6,402,031 B1 | 6/2002 | Hall ........................... 235/400 |
| 6,406,152 B1 | 6/2002 | Hoekstra et al. ............ 359/603 |
| 6,424,914 B1 | 7/2002 | Lin ........................... 701/214 |
| 6,429,812 B1 | 8/2002 | Hoffberg et al. .......... 342/537.1 |
| 6,431,872 B1 | 8/2002 | Shiraishi et al. |
| 6,449,540 B1 | 9/2002 | Rayner ........................ 701/35 |
| 6,458,511 B1 | 10/2002 | Wittig et al. ................ 430/302 |
| 6,474,683 B1 | 11/2002 | Breed et al. ................. 280/735 |
| 6,476,731 B1 | 11/2002 | Miki et al. .................. 340/937 |
| 6,480,103 B1 | 11/2002 | McCarthy et al. ....... 340/425.5 |
| 6,487,500 B2 | 11/2002 | Lemelson et al. .......... 701/301 |
| 6,496,778 B1 | 12/2002 | Lin ........................... 701/215 |
| 6,498,570 B2 | 12/2002 | Ross .......................... 340/901 |
| 6,501,393 B1 | 12/2002 | Richards et al. ............. 340/993 |
| 6,505,503 B1 | 1/2003 | Teresi et al. .................. 73/117 |
| 6,513,833 B2 | 2/2003 | Breed et al. ................. 280/735 |
| 6,522,325 B1 | 2/2003 | Sorokin et al. ............. 345/472 |
| 6,542,077 B2 | 4/2003 | Joao .......................... 340/539 |
| 6,597,392 B1 | 7/2003 | Jenkins et al. ............. 348/207.1 |
| 6,621,411 B2 | 9/2003 | McCarthy et al. ....... 340/425.5 |
| 6,639,522 B2 | 10/2003 | Derderian .................... 340/945 |
| 6,640,145 B2 | 10/2003 | Hoffberg et al. .............. 700/83 |
| 6,661,345 B1 | 12/2003 | Bevan et al. ................ 340/575 |
| 6,681,195 B1 | 1/2004 | Poland et al. ............... 702/142 |
| 6,683,584 B2 | 1/2004 | Ronzani et al. ................ 345/8 |
| 6,697,103 B1 | 2/2004 | Fernandez et al. .......... 348/143 |
| 6,697,415 B1 | 2/2004 | Mahany ..................... 375/130 |
| 6,708,086 B2 | 3/2004 | Richard ......................... 701/1 |
| 6,711,474 B1 | 3/2004 | Treyz et al. .................... 701/1 |
| 6,718,239 B2 | 4/2004 | Rayner ........................ 701/35 |
| 6,850,209 B2 * | 2/2005 | Mankins et al. ............. 345/1.3 |
| 2001/0003715 A1 | 6/2001 | Jutzi et al. .................... 463/40 |
| 2002/0052724 A1 | 5/2002 | Sheridan ....................... 703/78 |
| 2002/0115454 A1 | 8/2002 | Hardacker .................. 455/457 |
| 2002/0138587 A1 | 9/2002 | Koehler et al. ............. 709/207 |
| 2002/0187460 A1 | 12/2002 | Luttmann et al. ............. 434/30 |
| 2003/0105558 A1 | 6/2003 | Steele ........................... 701/1 |
| 2003/0112354 A1 | 6/2003 | Ortiz et al. ............ 348/333.01 |

FOREIGN PATENT DOCUMENTS

| | | |
|---|---|---|
| EP | 0299911 A1 | 1/1989 |
| EP | 0525961 A2 | 2/1993 |
| FR | 2571877 A1 | 4/1986 |
| JP | 1241589 A | 9/1989 |

OTHER PUBLICATIONS

"Stack motorsport instrumentation and data logging"; reprinted from http://www.stackltd.com/dists.html, printed on May 19, 2004, 6 pages.

"Stack motorsport instrumentation and data logging"; Data Acquisition Systems, reprinted from http://www.stackinc.com/dataacquisition.html, May 20, 2004, 21 pages.

"Stack dash display systems with analogue tachometer", Stack Datapro-Overview; reprinted from http://www.stackinc.com/swl.html, May 20, 2004, 17 pages.

"Stack digital predictive lap timer with analogue tachometer", Predictive Lap Timing, reprinted from http://www.stackinc.com/predict.html, May 19, 2004, 3 pages.

"Stack dash display systems with analogue tachometer", Standard Sensors and Interfaces, reprinted from http://www.stackinc.com/sensors.html, May 20, 2004, 3 pages.

"Stack Synchronised Video-Logger with Stack Data Logging Systems"; VCR Data Overlay Video-Logger Systems, reprinted from http://www.stackinc.com/video.html, May 20, 2004, 8 pages.

"Stack dash display systems with analogue tachometer", Engineering Data Logging Systems; ST8900 Engineering Systems, Specification and price list, reprinted from http://www.stackinc.com/engineering.html, May 19, 2004, 16 pages.

"Stack dash display systems with analogue tachometer", Standard System Modules, reprinted from http://www.stackinc.com/modules.html, May 19, 2004, 2 pages.

"Stack Preconfigured Dash Logger Systems", Preconfigured Dash-Logger System Packages (ST8102S/SP), reprinted from http://www.stackinc.com/8102.html, May 19, 2004, 3 pages.

"Stack Steering Wheel Dash Display Systems", ST8600 Steering Wheel Dash System and price list, reprinted from http://www.stackinc.com/steeringdash.html, May 20, 2004, 5 pages.

"Stack Configurable Dash Display Systems"; Configurable Dash Display Systems (ST8800 & ST8800M), reprinted from http://www.stackinc.com/st8800.html, May 20, 2004, 3 pages.

"Stack dash display systems with analogue tachometer", Race Dash Display Systems, reprinted from http://www.stackinc.com/display1.html, May 19, 2004, 4 pages.

"Stack dash display systems with analogue tachometer", Stack Type ST8100 Dash Display, reprinted from http://www.stackinc.com/st8100.html, May 19, 2004, 3 pages.

"Stack dash display systems with analogue tachometer", Stack Type ST8110 Boost Dash, reprinted from http://www.stackinc.com/boostdash.html, May 19, 2004, 2 pages.

"Stack dash display systems with analogue tachometer", Stack Type ST8100H Hill Climb Display, reprinted from http://www.stackinc.com/st8100h.html, May 19, 2004, 2 pages.

"Stack dash display systems with analogue tachometer", ST700 Dash Display Systems with Price List, reprinted from http://www.stackinc.com/st700h.html, May 19, 2004, 6 pages.
"ST8130 Rally & Street Dash Display with Analogue Tachometer", Stack Type ST8130 Street-legal with a racing pedigree!; reprinted from http://www.stackinc.com/st8130.html, May 19, 2004, 4 pages.
"Stack dash display systems with analogue tachometer", Stack ST500 Tach-Timer with Price List, reprinted from http://www.stackinc.com/tachtim1.html, 5 pages.
"Stack Tachometers and boost gauges", Stack Tachometers and Boost Gauges, reprinted from http://www.stackinc.com/tacho1.html, May 19, 2004, 8 pages.
"Stack PC Analysis for Lap Timing", Stack PC Analysis Package, reprinted from http://www.stackinc.com/pcanalysis.html, May 20, 2004, 1 page.
"Stack ST200 Clubman tachometer with exceptional accuracy and reliability", Stack Type ST200 Clubman Tachometer, reprinted from http://www.stackinc.com/st200.html, May 19, 2004, 2 pages.
Professional Tachometers, Standard Features, reprinted from http://www.stackltd.com/pdf/protech.pdf, May 19, 2004, 1 page.
"ST400 Stack Professional Race Proven Tachometer", Stack Type ST400 3.5" (88mm) Professional Tachometer, reprinted from http://www.stackinc.com/st400.html, May 19, 2004, 3 pages.
"ST400C Classic Professional Tachometer", Stack 3.5" (88mm) Chronotronic Tachometer, reprinted from http://www.stackinc.com/chronotronic.html, May 19, 2004, 2 pages.
"ST400C Classic Professional Tachometer", Stack Type ST400C 3.5" (88mm) Classic Tachometer, reprinted from http://www.stackinc.com/st400c.html, May 19, 2004, 2 pages.
"ST430 Professional 'Monster' Tachometer", Stack ST430 5" (125mm) Professional MONSTER Tachometer, reprinted from http://www.stackinc.com/st430.html, May 19, 2004, 2 pages.
"Stack ST430C 5" (125mm) classic tachometer", Stack ST430C 5" (125mm) Classic MONSTER Tachometer, reprinted from http://www.stackinc.com/st430c.html, May 19, 2004, 2 pages.
"ST437/8C data recording tachometer", ST437/8C (125mm) MONSTER Recording Tachometer, reprinted from http://www.stackinc.com/st437c.html, May 19, 2004, 2 pages.
"Stack applications in Kart Racing", Kart Racing, Hill Climb, Circuit Racing, Rally Driving and Course Training, reprinted from http://www.stackinc.com/karts1.html, May 19, 2004, 13 pages.
"Stack engineer data Logging Systems", Stack Engineer Systems—New Products information form, reprinted from http://www.stackinc.com/datalog1.html, May 19, 2004, 2 pages.
"Stack systems for Automotive Test Applications", Range of Modules, Synchronized Video, DataPro Designer Software and DataPro Analysis software, reprinted from http://www.stackinc.com/oem1.html, May 19, 2004, 7 pages.
CNN.com—Live, Digital video heading to U.S. Police Cars, reprinted from http://www.cnn.com/2004/TECH/ptech/04/20/police.videos.reut/index.html, Apr. 20, 2004, 2 pages.
Welcome to CDS Competition Data Systems, http://www.competitiondata.com/index.htm, Jul. 14, 2004, 9 pages.
CDS Competition Data Systems, Commander II Data System Overview, http://www.competitiondata.com/commander/prod_main_commander.htm, Jul. 14, 2004, 19 pages.
CDS Competition Data Systems, Trackmaster Analysis Software Overview; http://www.competitiondata.com/trackmaster/prod_main_tm.htm, Jul. 14, 2004, 24 pages.
CDS Competition Data Systems, Command View Software Overview; http://www.competitiondata.com/commander/prod_main_comview.htm; Jul. 14, 2004, 7 pages.
CDS Competition Data Systems, Informer Overview; http://www.competitiondata.com/informer/prod_main_informer.htm, Jul. 14, 2004, 16 pages.
CDS Competition Data Systems, Co Pilot "Smart" Display Overview; http://www.competitiondata.com/co-pilot/prod_main_copilot.htm, Jul. 14, 2004, 25 pages.
CDS Competition Data Systems, SSI Overview; http://www.competitiondata.com/ssi/prod_main_ssi.htm, Jul. 14, 2004, 10 pages.
CDS Competition Data Systems, Sensors Overview; http://www.competitiondata.com/sensors/prod_main_sensors.htm, Jul. 14, 2004, 2 pages.
CDS Competition Data Systems, Applications Overview; http://www.competitiondata.com/applications/prod_main_apps.htm, Jul. 14, 2004, 18 pages.
CDS Competition Data Systems, Data Acquisition Products . . . For All Forms of Motor Sports; Hardware Technical Guide, http://www.competitiondata.com, Jul. 14, 2004, 26 pages.
NASCAR.com : trackpass : about, "TrackPass, PitCommand, In-Car Audio, Live Leaderboard and Multimedia On-Demand", reprinted from http://www.nascar.com/multimedia/about/index.html, Dec. 11, 2003, 27 pages.
Trimble—Differential GPS, "Why do we need it, How Differential Works, Where to get Differential Corrections and Other ways to work with Differential GPS", reprinted from http://www.trimble.com/gps/dgps.html, Dec. 11, 2003, 18 pages.
Alfano, USA, "Alfano—USA Products Overview", reprinted from http://www.alfano-usa.com/Alfano/home.html, Jan. 27, 2005, 18 pages.
Data Acquisition and Data Logger fro Racing Acquisition, "Advantage MotorSports Racing Data Acquisition Systems, Results Data Group, Profressional Data Group, Ultimate 30 Data Group, Drag Racing, ProKart Data Group, Sensors, Windows Software and Lap Timing Systems", reprinted from http://www.advantagemotorsports.com/, Jan. 27, 2005, 56 pages.
AIM, "Overview of Aim Kart Products and Accessories", reprinted from http://www.aim-sportline.com/KART/overview.htm, Jan. 27, 2005, 95 pages.
"Digatron—Performance Data Acquisition Systems", Lap Timing & Engine Monitoring Gauges, reprinted from http://www.digatronusa.com/, Jan. 27, 2005, 43 pages.
"Racelogic, VBox, Blitz, Traction Control and CAN Design", reprinted from http://www.racelogic.co.uk/, Jan. 27, 2005, 47 pages.
"piXpress USA—Product Information for X Sport, Delta Clubman and Delta Lite", reprinted from http://www.pixpress.com/html/usprodinfo.asp, Jan. 27, 2005, 19 pages.
Pi Research, Aerodynamic Sensors, Beacon Equipment, Displacement Sensors, Inertial Sensors, Instrumentation, PiVIDS, Pressure Sensors and Software; reprinted from http://www.piresearch.com/print.cfm/section/home/editID/107, Jan. 27, 2005, 38 pages.
ROC Timing Systems—EPOS Venu Management—AMB Transponder Timing and Scoring for Karting and Motorsports . . . , reprinted from http://www.roctiming.com/home.asp, Jan. 27, 2005, 38 pages.
"State-of-the-art Control for your Karting Business", reprinted from http://www.racing.net/oskarcenter.htm, Jan. 27, 2005, 8 pages.
Mitte, "Caesar Datensystems 2004—Data Acquisitions, CAN-based Measuring, Telemetry Systems, Software for Testing, Test-Rig Control, NVH Analysis, Automotive Sensors and Integrated Solutions", reprinted from http://www.caeser-datensysteme.net/Caeser_eng/Produkte/Produkte.php, Jan. 27, 2005, 35 pages.
"Corsa Instruments: Products, Software, FAQ, Articles, Order Forms and Dealers", reprinted from http://www.corsa-inst.com/, Jan. 27, 2005, 9 pages.
Stack Data Pro Software from Apr. 1, 2001, reprinted from http://web.archive.org/web/*/http://stackltd.com, on Aug. 17, 2004, 13 pages.
"Nintendo 64: Mario Kart 64," reprinted from http://ign64.ign.com/articles/150/150502p1.html, on Aug. 18, 2004, 6 pages.
"PlayStation Gran Turismo," reprinted from http://psx.ign.com/articles/152/152226p1.html, on Aug. 18, 2004, 4 pages.

* cited by examiner

MULTIMEDIA RACING EXPERIENCE SYSTEM

CROSS-REFERENCED APPLICATIONS

This application claims priority under 35 U.S.C. § 119(e) from U.S. Provisional Patent Application Ser. No. 60/333,499, titled "Multimedia Racing Experience System," filed Nov. 28, 2001, the entirety of which is incorporated herein by reference.

FIELD OF THE INVENTION

The present invention relates to a multimedia racing experience system.

BACKGROUND OF THE INVENTION

Automotive racing is one of the most rapidly growing sports in America today and around the world. Fans relate to automotive racing because of the precision driving at high rates of speed. Automotive racing is also exciting to watch both in person or on television. The growth of automotive racing is also reflected in previous efforts to enhance the racing experience.

Some previous work focused on auto race monitoring systems. One previous system provides a race track with a ground positioning system, including at least three transmitters, transmitting signals to be received by at least a pair of receivers in each racecar racing. The receivers instantaneously determine their position and, accordingly, the exact position of the racecar upon the racetrack. This information, along with parameters such as vehicle speed, engine temperature and oil pressure, are sent by a transmitter to a receiver interconnected with a main frame computer, which uses such information to replicate each of the vehicles in a given race in real-time. The replicated information is made available to the Internet and the audio/video receivers connected thereto.

Other work has focused on simulating the experience within the vehicle. One previous simulator is a reactive ride simulator, including a package of sensors along with a telemetry radio transmitter and or recorder. This package is carried at a movable remote site, such as an actual vehicle. A radio receiver, or a player for the recorded data from the remote site, is interfaced with a decoder providing electronic signals, which include a replication of the sights, sounds and motions experienced at the remote site. A motion base is used to provide the accelerations necessary to replicate the G-forces experienced at the remote site, while a cabin on this motion base is associated with audio and visual presentation devices, so that a passenger on the reactive ride simulator also receives the audio and visual sensations of being at the remote site.

Another previous type of auto race monitoring system allows for sensing, recording and selectively displaying data associated with operational characteristics of a vehicle and an associated engine. The system includes a plurality of transducers delivering signals corresponding to such operational characteristics to a programmable logic device. These signals are converted to appropriate information signals, which are stored in an associated storage device and can be selectively displayed on a suitable display device.

Still another previous auto race monitoring system allows for controllably sensing, recording and selectively displaying data associated with operational characteristics of a vehicle. A plurality of transducers are connected to a programmable logic device along with data entry, data storage and data display devices. Information received from the transducers is processed by the logic device to determine whether a certain operational characteristic has occurred during the time that certain other characteristics are present. In addition, the amount of time that the particular characteristic occurs is determined.

Another previous type of simulator system is adaptable to an actual craft or existing simulator. The system comprises computer hardware and software capable of simulation, combinations of simulations and networked simulations. Computer inputs come from sensors attached on or near control and operation members. Computer output is sent to overlay displays and other components. Visual, audio and motion cuing systems are added to increase realism where appropriate to the simulation.

Another previous racecar monitoring system provides a vehicle data recording system which has connections to one or more analog sensors, and stores data from the sensors in a memory during laps of a track. The system provides for analog to digital conversion for converting analog data from the sensors into digital data, and triggers a procedure for storing of the data in memory. Periods of storing of the data in memory are automatically started and stopped. The system stores in memory a set of data for a datum period, and has means for storing further sets of data in a memory. A set of data stored during a first period is compared with a set of data stored during a further period and one of the sets of data is selected for retention in memory in accordance with a predetermined algorithm. The retained set of data is compared with the datum set and the selected set is output.

Although this previous work provides useful systems for simulating or receiving information from a vehicle or craft, none make use of a combination of technology and technical media, as described herein, to produce a fully automated event-driven multimedia production and delivery system, capturing the experience of a rider in a vehicle or craft. What is needed is an event-driven, multimedia system and methodology that provides a more stimulating way of re-experiencing riding in a vehicle such as a racecar or other craft. The system and methodology should capture the full breadth of the racing experience, including video, audio, vehicle telemetry, and driver biotelemetry information during the ride. Additionally, the system and methodology should incorporate both on-vehicle and remote information as part of the ride experience.

SUMMARY OF THE INVENTION

The invention is a fully automated, programmable and event driven, tri-media racing experience system. For clarification, tri-media describes the integration of video, audio and measurement data as a coherent communications media.

The racing experience system is designed as a turnkey service for racing and driving school operators, racetrack owners and operators, and both professional and amateur race teams. The invention enables the capture and processing of real-time tri-media data during a racing or driving activity. The system is scalable and is intended to accommodate multiple, concurrent vehicle activities.

The on-vehicle real-time, media production system includes a plurality of input devices mounted in the vehicle, such as cameras, microphones, biometric sensors, and vehicle performance sensors. Additional input devices include a global positioning system receiver, a wireless track position beacon receiver, and a radio-frequency receiver that receives video broadcast signals from remote, strategically placed, radio transmitter-enabled cameras located trackside. All input devices are connected to an on-vehicle tri-media production system comprised of one or more processing units. Software operating on the on-vehicle server computer integrates and transforms the diverse tri-media inputs into synchronized tri-media data streams.

Tri-media data streams are transmitted to a central post-production system, such as a central kiosk, via a media transfer system. The transfer process is facilitated by one of two means: digital solid-state memory devices, such as flash cards or memory sticks, or by wireless radio-frequency transmission. The central post-production system can either immediately display the tri-media data stream or record the tri-media data stream for later viewing.

Certain embodiments of the present invention can variously provide an exciting and informative re-creation of a racecar driving experience; an exciting and informative recreation for people who wish to immerse themselves in a racecar driving experience; a professional driver training tool to train professional drivers; and, via real-time data analysis, an event driven re-creation of a racecar driving experience.

Further, certain embodiments of the invention can convey supporting contextual and environmental information to enhance, clarify and focus the perception of the content in the re-created experience beyond what point-of-view video recordings of an event could accomplish.

BRIEF DESCRIPTION OF THE DRAWINGS

These and other more detailed and specific features of the present invention are more fully disclosed in the following specification, reference being had to the accompanying drawings, in which.

Similar reference characters denote corresponding features consistently throughout the figures.

DETAILED DESCRIPTION OF THE
PREFERRED EMBODIMENT

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
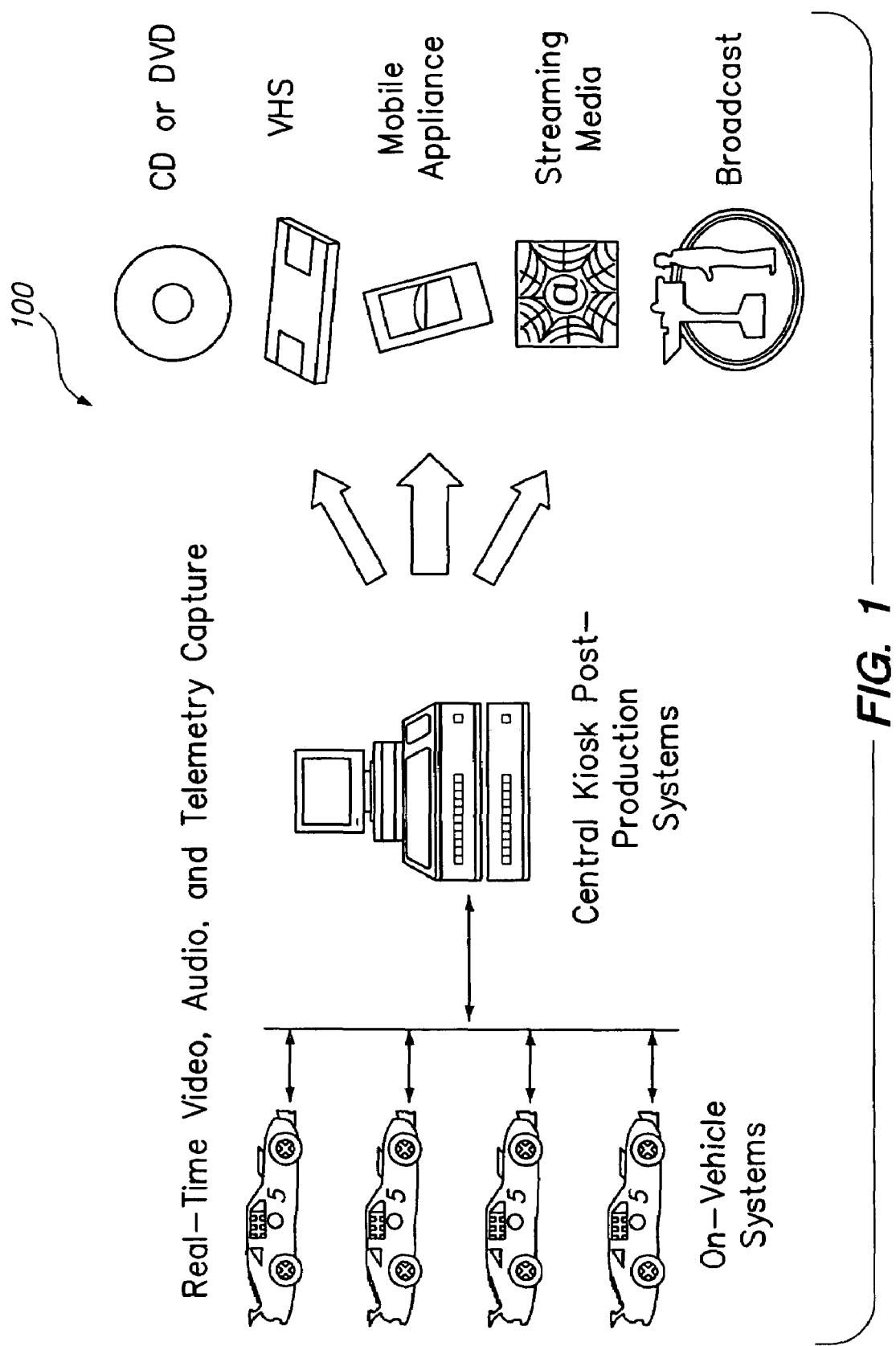
FIG. 1 provides a high level systems perspective of an embodiment of an experience-oriented multimedia racing system according to the present invention.

As illustrated in FIG. 1, the present invention is a multimedia racing experience system 100 that captures and processes real-time data from multiple sources and media types. The term tri-media is used to indicate the inclusion of video, audio, and telemetry data. The tri-media data is transformed into a coherent edutainment multimedia presentation that encapsulates and embodies the excitement of a consumer's driving or racing school experience. The multimedia racing experience system 100 facilitates the recording or broadcast of the experience. Recorded experiences are delivered in either fully interactive mode via CD or DVD disc or simple playback mode via VHS or similar tape media. The experiences can also be distributed to consumers via streaming media or broadcast modes.

Figure 2:
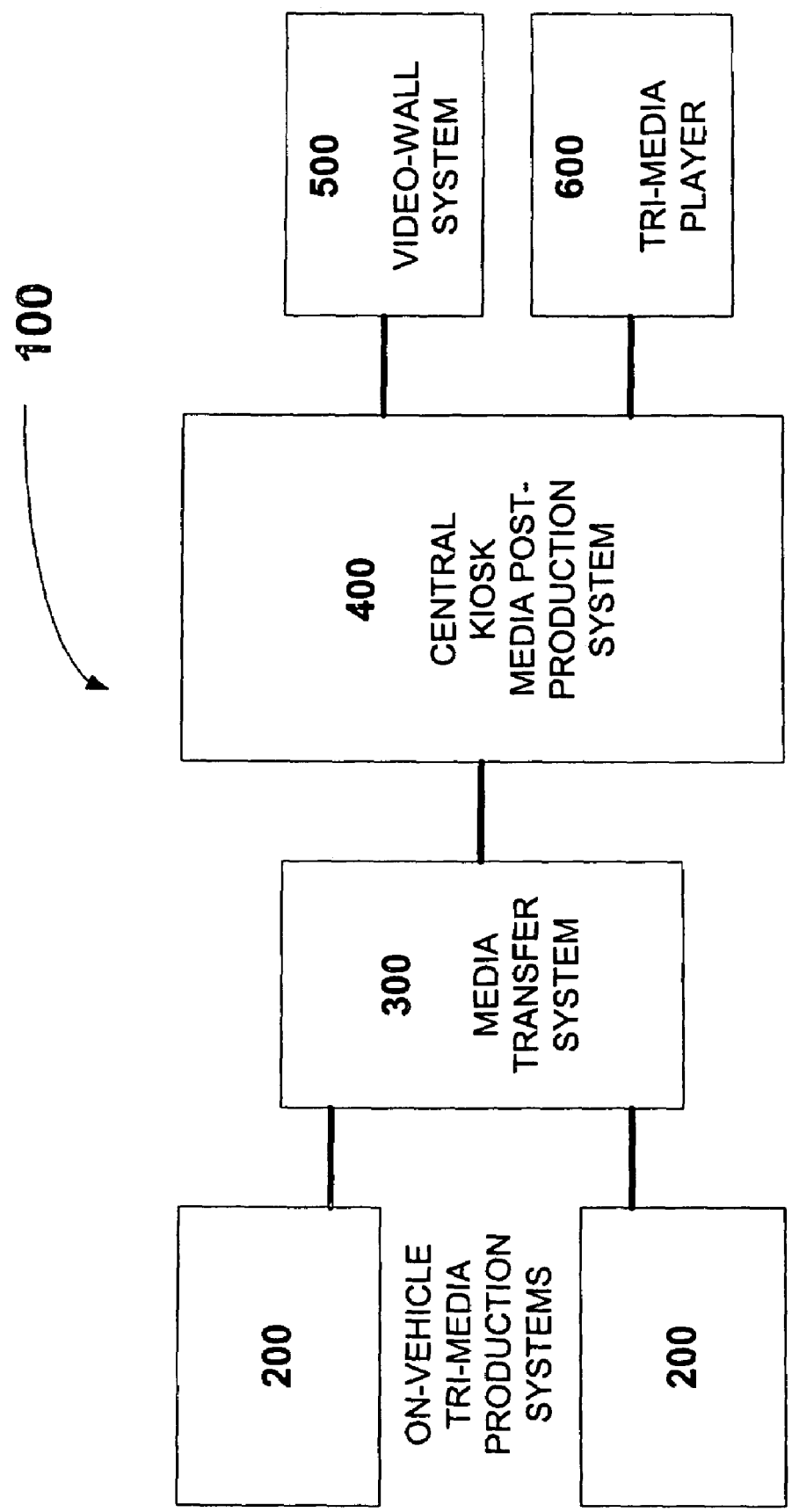
FIG. 2 is a system architecture block diagram illustrating the subsystems in an embodiment of the present invention.

FIG. 2 is a block diagram illustrating an embodiment of a multimedia racing experience system 100. The system includes five subsystems: on-vehicle tri-media production systems 200; media transfer systems 300; central kiosk media post-production system 400; videowall system 500; and tri-media player systems 600. The features and capabilities of the subsystems are described in detail below.

Figure 3:
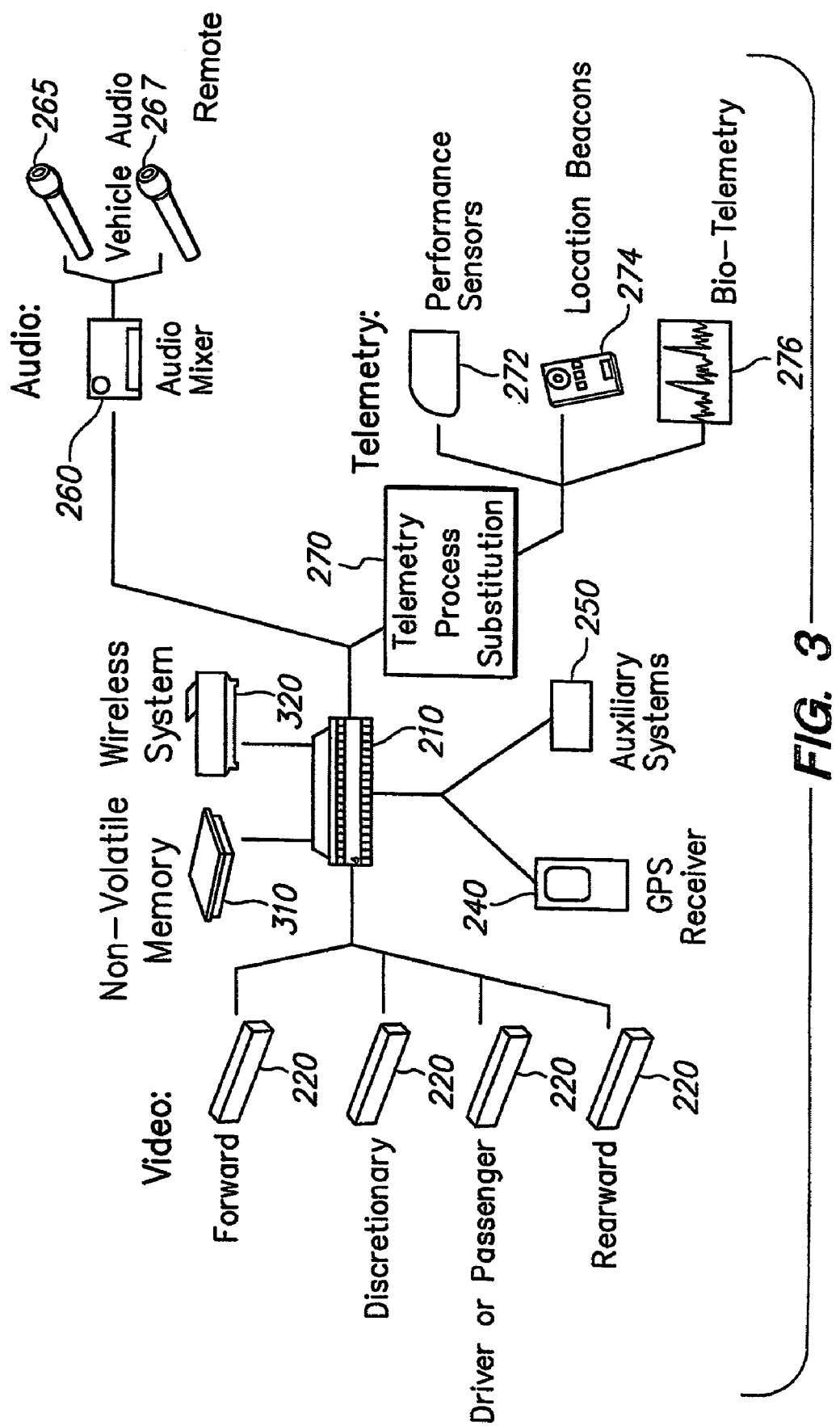
FIG. 3 schematically illustrates the various subsystems and components of an on-vehicle tri-media production system according to an embodiment of the present invention.

The tri-media data collection process is accomplished via on-vehicle production systems 200. FIG. 3 illustrates the subsystem components for an embodiment of the on-vehicle production system. As illustrated in the figure, a control unit 210 serves as the heart of the on-vehicle production system. All tri-media data collection input devices are connected to the control unit.

Video data is collected by one or more video cameras 220 mounted at various locations on the vehicle. The control unit 210 can also receive additional remote video data feeds via wireless radio frequency transmission from cameras 220 at strategic locations around the track or in the pit area. Camera views and points of installation are configurable to suit the needs of a driving or racing school operator. Although the system may be variously configured, a preferred configuration for an embodiment involving four on-vehicle cameras is as follows. The first on-vehicle camera provides a forward-looking driver's view. The second on-vehicle camera provides a view from the rear of the racecar. The third camera provides a view of the driver or passenger. A fourth on-vehicle camera provides an action view appropriate to the style of racing. For example, photography of the driver's footwell to capture pedal control activity is appropriate for sports car and road racing experiences. An exterior side projecting view of the outer track wall may be preferable for stock car and oval track racing. Additionally, remote cameras are located around the track to provide exterior views, such as a view of the start finish line, a view of the pit area, or views of curves or straightaways on the track. Conventional cameras and radio frequency transmitters, including wireless cameras, may be used in the system. An example of a suitable wireless camera system is the digital wireless camera system available from Thomson Grass Valley of Paris, France. Other suitable cameras are available from Ultrak, Inc. of Lewisville, Tex.

The capture and production of high quality audio data is also a preferred aspect of the invention. Particularly, with the tri-media racing experience system is processed and enhanced for consumer enjoyment and satisfaction, to provide specific performance-oriented information to the consumer. Multiple microphonic devices 265 are placed at strategic locations throughout the racecar. The devices 265 are used to capture key audio data, such as driver and passenger vocals and the vehicle's engine, transmission, and exhaust notes. In an embodiment, the microphonic devices are connected via audio cabling to an audio mixer 260 housed in the on-vehicle control unit 210. The audio mixer 260 includes digital noise filtering and automatic gain control circuitry to maximize effective sound recording in a racecar environment. Remote microphones 267 can also be implemented, by placement locations such as the pit area or along the track to provide additional audio tracks. The microphones 267 are connected to control unit 210 via radio frequency transmitters. In an embodiment, the tri-media racing experience system includes audio subsystems that isolate specific performance related sounds and filter and mix these to convey coherent sonic information to the consumer. Suitable microphones for use in the racecar are available from Shure Incorporated of Evanston, Ill. Suitable microphones for use in a driver's helmet are available from Gentex Corporation of Carbondale, Pa.

The system may also collect and record real-time biometric data from the vehicle driver or passenger. Biometric data, also referred to herein as biotelemetry data, can be transformed into a biofeedback stream that has both an entertainment value for the casual fan and an educational value for student drivers. The biotelemetric information is preferably collected via non-invasive, skin contact based, pulse oximeter devices (not shown) that gather pulse, respiration rate, and oxygen saturation range ($SpO_2$) data from the driver/passenger. The pulse oximeter may be any conventional, commercially available pulse oximeter. The pulse oximeter is connected by cabling to a biotelemetry-processing unit 276 housed in the on-vehicle tri-media control unit 210.

The system also preferably collects real-time vehicle performance telemetry data 272. Multiple sensors (not shown) are strategically placed in the vehicle to capture driver control activities and vehicle handling information. The vehicle telemetry sensors can, for example, monitor wheel-speed, RPM, lateral and longitudinal G-forces, steering angle, throttle position, and brake pedal position. Additionally, track location beacon sensors are used to record lap times and lap counts 274. Track location and beacon sensors may also be used to identify a vehicle's current position on the track. In an embodiment, vehicle performance telemetry and location sensors are connected by cabling to a telemetry processing subsystem 270 housed in the on-vehicle tri-media control unit 210. This information is conveyed on the software player data presentation illustrated in FIG. 5 that is discussed below. Various conventional vehicle telemetry sensors can be used to provide the described vehicle performance telemetry data.

In an embodiment, vendor specific binary telemetry data gathered during vehicle operation is automatically converted, via a program, to standard measurement units. For example, speed data is expressed as miles per hour (mph) and tenths of mph. In an embodiment, each telemetry record has a timestamp that represents the date and time the telemetry record was captured. Using this timestamp, the telemetry data is synchronized with the video start recording mark and a timeline is constructed that spans the start recording mark and video end recording mark. In an embodiment, the timeline has intervals of 200 milliseconds and the telemetry record that is closest to that interval is used for that timeline interval. The converted data elements are then formatted for inclusion in the tri-media presentation. In an embodiment, the converted data elements are formatted into plain text with tabs separating each data element and then written to a file that is part of the image for the tri-media player output media.

Figure 5:
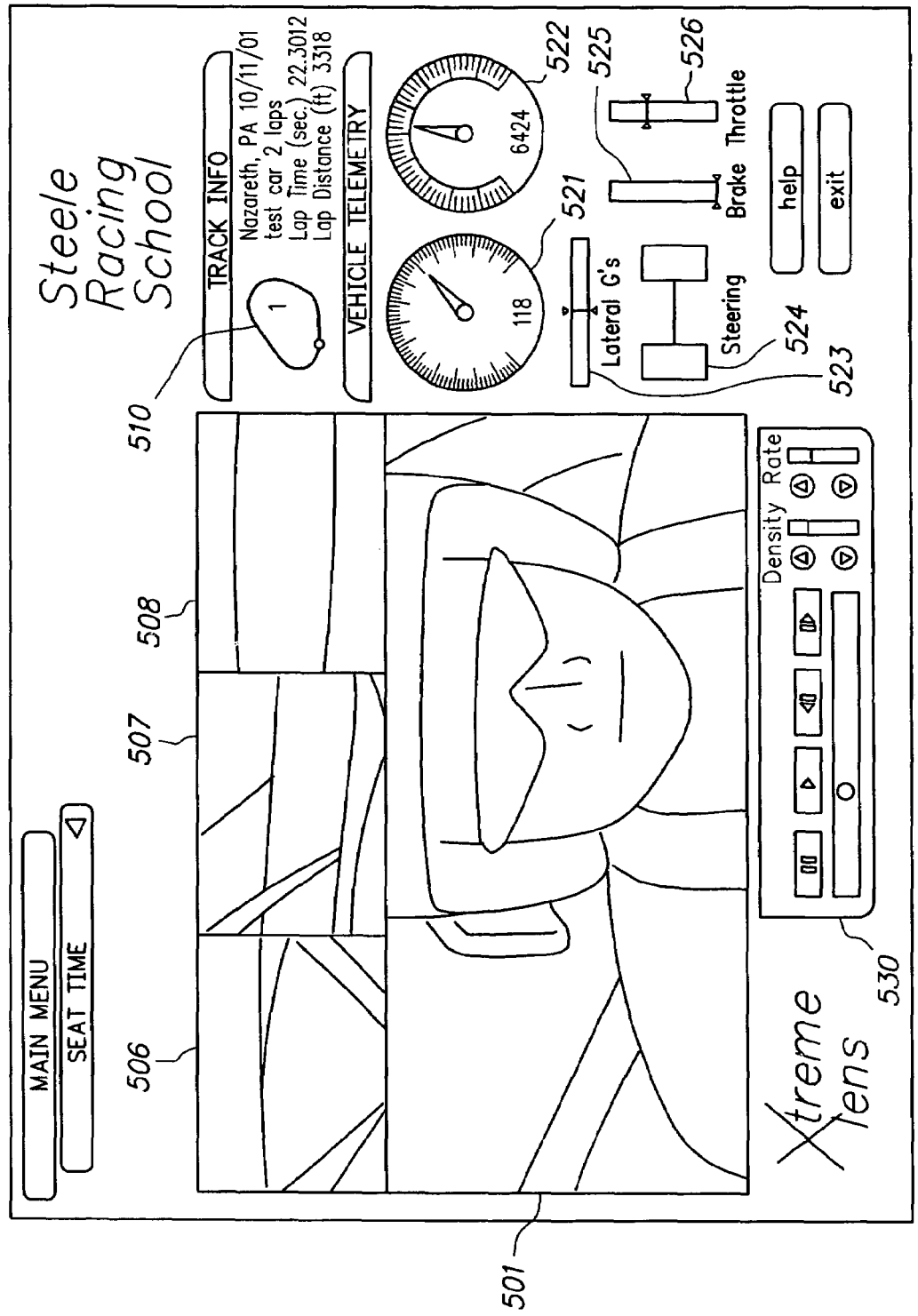
FIG. 5 is an illustration of a tri-media player application as viewed by the consumer. The figure depicts a "Seat Time" playback screen view of a consumer driving experience according to the present invention.

One of the features of the tri-media racing experience system 100 is the ability to trigger video switching based on real-time events. FIG. 5 illustrates a screen view of a consumer driving experience that is provided in a playback mode, particularly a "Seat Time" playback screen view. As indicated, the video images are presented in a quadripartite screen format including a primary camera view 501 and three secondary camera views 505, 506, and 507, aligned at the top of the primary view. In an embodiment the selection of which video to display in each of the camera views can be preprogrammed to switch automatically based on real-time analysis of the data derived from performance-sensors and biosensors. For example, in an embodiment the primary camera view 501 focuses on the driver/passenger when the vehicle is at rest or traveling slowly, secondary view 506 displays a forward track camera video, and secondary views 507 and 508 display output from other cameras When the vehicle reaches a predetermined speed as it exits the pit area, the primary view 501 is switched to a forward track camera view while the driver/passenger view is switched to secondary view 506. The camera view selection reverts to the initial state when the vehicle slows to enter the pit area. The primary and secondary camera viewing fields are fully selectable based on style of driving or individual preferences. The on-vehicle production control unit 210 controls the camera view switching process.

Alternatively, a track positioning subsystem provides a means for controlling on-vehicle video switching based on the vehicle's physical location on the track. A plurality of wireless beacon transmitter/receiver pairs (not shown) are used to control the video switching process, which is used to incorporate external trackside camera views of the on-track vehicle. The on-vehicle production system 210 can interpose the external trackside view with any of the on-vehicle camera views. Those skilled in the art will recognize that the switching schemes described here may also be used for selection of audio or telemetry data for inclusion in a tri-media data stream. Suitable beacons include the single channel, 10 channel, or 32 channel beacons available from Pi Research, Inc. of Indianapolis, Ind.

Referring again to FIG. 3, the control unit 210 contains one or more processing units to multiplex and encode the plurality of input data sources. In an embodiment, the control unit 210 includes one or more interconnected computers and an on-vehicle computer server. Suitable computers include single board computers, such as those available from Kontron America of San Diego, Calif. The control unit 210 preferably encodes and multiplexes the input data in real-time to facilitate synchronization of data from the various input sources. The multiplexing and encoding are carried out using standard formats, such as MPEG encoding (for example, MPEG1, MPEG2, MPEG3, or MPEG4). Coherent, synchronized tri-media data streams are output from the control unit for post-production processing via the media transfer system 300 components. The transfer process can be accomplished in various ways. In an embodiment, the transfer is accomplished by use of removable solid-state memory devices 310, such as a conventional flash memory card. In another embodiment, the transfer occurs by wireless radio frequency transmission via transmitter 320. The choice of a method of transfer is typically dictated by customer desires. Systems can be configured to support one or both media transfer modes. In an embodiment, the tri-media data streams are generated in real-time by the on-vehicle control unit 210 and output to the media transfer interface. For on-vehicle systems configured with removable solid-state memory devices 310, the memory device is removed from the control unit 210 and physically transported to the central kiosk media post-production system 400 at the completion of a racing/driving experience. For on-vehicle systems configured with wireless communications subsystems, the real-time tri-media data streams are output from the on-vehicle control unit to a transmitter, such as microwave radio frequency transmitter 320. In an embodiment, the invention makes use of a rooftop antenna designed to support transmission and reception of microwave signals by a vehicle traveling at high-speeds. The electromechanical characteristics of the on-vehicle and stationary antennae were designed to minimize signal loss and interference due to multi-path, Doppler, and pointing error effects. In this embodiment, the microwave radio frequency transmitter 320 makes use of the 5.8 GHz frequency band authorized by the Federal Communications Commission for low-power unlicensed operations. It is anticipated that further iterations of the invention will make use of other frequency bands as appropriate to achieve performance enhancement or meet changing regulatory requirements.

Figure 4:
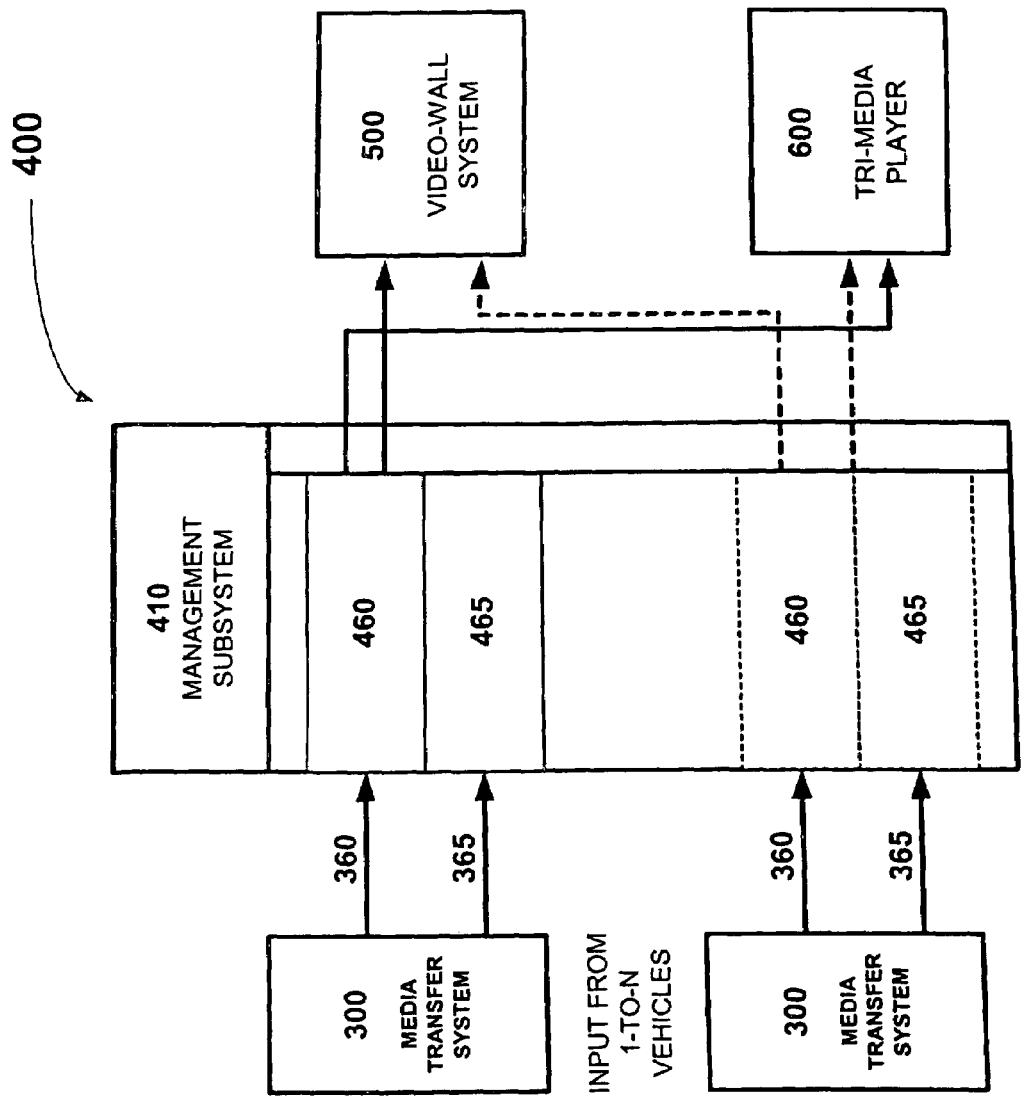
FIG. 4 is a functional block diagram depicting a post-production and data dissemination process according to an embodiment of the present invention.

FIG. 4 is a schematic diagram that illustrates an embodiment of a central kiosk-based system 400 and a corresponding tri-media post-production and data dissemination process. The illustrated central kiosk-based system 400 serves as the cornerstone of the post-production process. Preferably, the system is designed for near-autonomous operation in a rugged open-air trackside environment, with system operations being automated and requiring minimal human operational control. Operator interaction can be limited to powering the system on/off, checking system status, and inserting and removing the appropriate tri-media player media, such as CD disks. Various configurations can be provided for interfacing with the operator, such as a conventional computer video display, keyboard and mouse, or a touch screen display unit.

The role of the central kiosk system 400 is to transform and integrate tri-media data streams received from on-vehicle systems 200 with prerecorded edutainment data into an appropriate output media format for consumer usage. As illustrated in FIG. 4, a computer-based management subsystem 410 is used to monitor and control central kiosk post-production system operations. One or more media production computers 460 and 465 perform tri-media data stream processing, including decoding and displaying the tri-media data stream. In an embodiment, media production computers 460 and 465 are workstations configured with software for processing tri-media data streams. The central kiosk system is modularly expandable to support from 1-to-N independently functioning media production computers. The modularly expandable nature of the central kiosk system facilitates concurrent post-production support for multiple on-vehicle systems.

In some embodiments, the central kiosk media production computers 460 and 465 are configured to support one of two modes of media transfer from the on-vehicle systems. Computers designated 460 in FIG. 4 are configured to support tri-media data stream transfer via solid-state memory devices. In an embodiment the post-production process is initiated by the insertion of the solid-state memory device into a receptacle on the media production computer. The kiosk operator will then be prompted on the kiosk management subsystem display unit to load the appropriate tri-media player output media, such as a CD, DVD, or VHS tape. The data recording process is fully automated. On completion of the recording phase, the kiosk operator will be prompted to remove the output media. The output media is now ready for transfer to the consumer. Examples of displays generated from the data recorded on output media are provided below.

In another embodiment, the central kiosk can be equipped with media production computer subsystems 465 configured to support tri-media data stream collection via wireless radio frequency reception. Microwave reception is facilitated via a modularly expandable antenna array capable of supporting a plurality of real-time on-vehicle tri-media transmissions. The media production computer subsystem 465 includes a microwave receiver and decoder that outputs the real-time tri-media data stream for data recording as described above.

A video-wall system 500 provides an effective edutainment display. The modularly expandable video-wall system contains from 1-to-N display monitors. Nominally, the system is configured with 9 (nine) display monitors arranged in a 3-by-3 pattern. One of the monitors is connected to a DVD or VHS player to display prerecorded edutainment or advertising materials. The remaining monitors are connected to the central kiosk media production computers 460 and 465 to display post-production real-time or playback tri-media data collected from on-vehicle systems 200. Typically, racing school participants and their friends and family members wait for extended periods in-field seating with limited views of the on-track activities. The video-wall system will greatly enhance the entertainment value of the experience.

The final stage of the invention consists of the dissemination of the output product in various consumer media formats, such as CD, DVD, streaming web media, broadcast media, and VHS. In an embodiment, the product will be viewed on a CD or DVD disk via a custom-built tri-media player software application 600. The tri-media player is a software application that enables the captured tri-media data to be treated as a complete and coherent experience for interactive playback by the consumer. The application and tri-media files are delivered to the consumer in various media formats, including CD, DVD, television broadcast, Internet streaming, or similar digital consumer media. A racecar driver or passenger can recreate the experience by viewing synchronized and integrated tri-media information (visual images, audio and telemetric data) of a run on the track.

FIG. 5 illustrates an embodiment of a computer display screen format for tri-media player output during a "seat time" segment. The figure illustrates the real-time integration and synchronization of the video, audio, and telemetry data for a single drive or race. As described above, primary view 501 and secondary views 506, 507, and 508 display video outputs from cameras located either within the vehicle or located remotely around the track. Graphical track image 510 provides a representation of the shape of the track being traveled. Track image 510 may optionally include additional track information as well as an indicator mark for displaying a current track position. Telemetry indicators 521-526 provide information about the current operating parameters of the vehicle. FIG. 5 provides example of a telemetry display including a speedometer 521, a tachometer 522, a G-force indicator 523, a steering angle indicator 524, a brake position indicator 525, and a throttle indicator 526. In other embodiments, the telemetry indicators may include other vehicle telemetry data or may include biotelemetry data such as the pulse rate or respiration rate for the driver. In addition to the video, track image, and telemetry outputs, the display also includes audio tracks. The audio tracks can include engine and transmission sounds as well as driver or passenger commentary. In embodiments involving CD, DVD, or other digital storage media, playback of the tri-media data is controlled by control panel 530 shown at the bottom of FIG. 5. Control panel 530 allows the viewer to change the volume level, select a portion of the output for playback, and control the rate of playback for the tri-media output.

In addition to the driving experience tri-media data stream, the tri-media player output will contain supplemental edutainment data, such as video clips describing the driving school, racetrack, and racecar. In embodiments where the tri-media information is stored in CD or DVD format, a storyboard format is provided for ease of navigation and viewing. For example, a storyboard could comprise 5 'Acts': Act 1 would contain track history and design; Act 2 would contain information about the driving school where the tri-media presentation was made; Act 3 would contain pre-ride educational materials; Act 4 would contain the driving experience itself, including multiple views of the drive or race; and Act 5 would contain material regarding follow-on programs at the driving school. The specific content format will be customized to meet the needs of driving schools.

Figure 6:
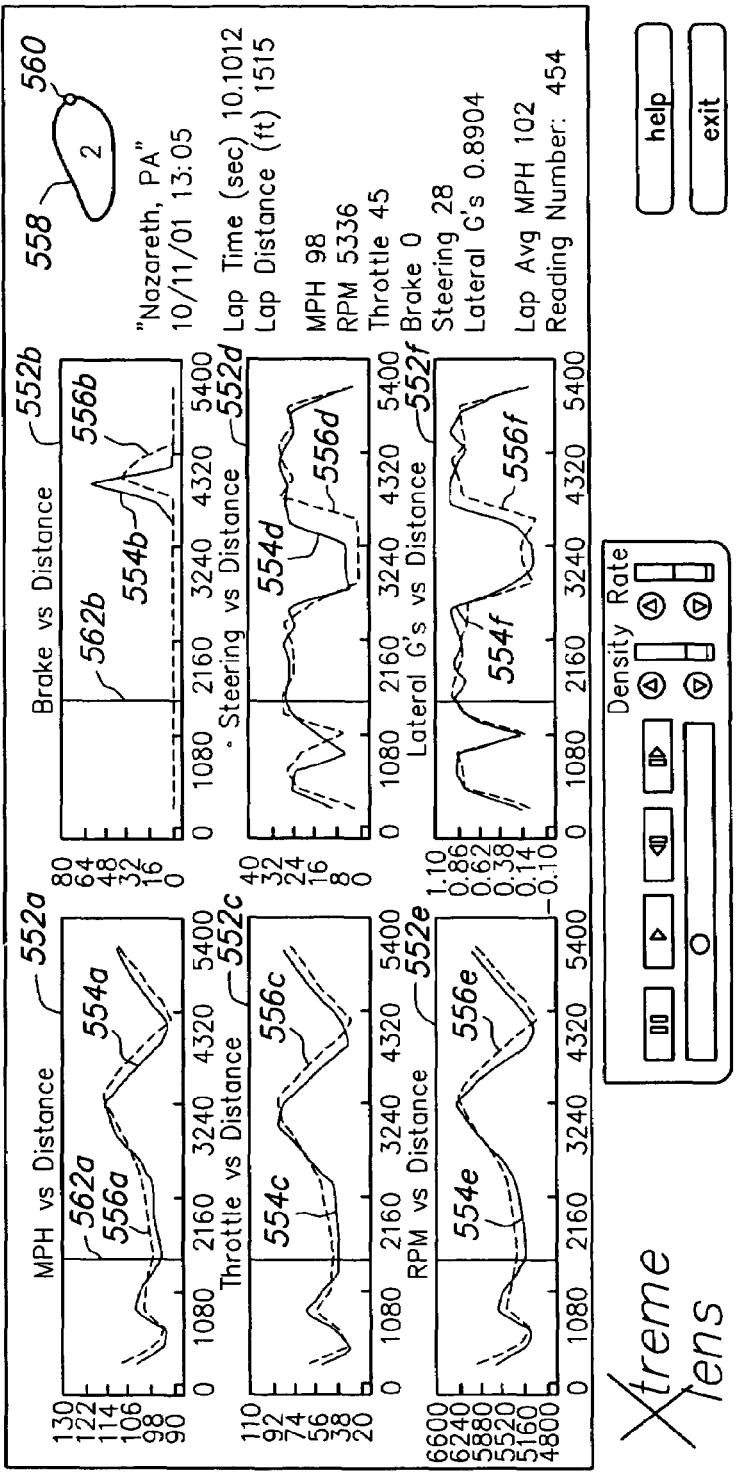
FIG. 6 illustrates a display of a tri-media player application during an "analysis" segment

FIG. 6 illustrates a computer display screen 550 of the tri-media player output during an "analysis" segment, where the performance of two drivers is compared side by side. In this embodiment, a statistical comparison between a subject driving experience and a reference are concurrently displayed alongside a graphical track display 558 of the test track. This allows a comparison of the consumer-driver's performance to a reference, according to various criteria and reference types. The shown comparison implements a series of graphs 552a-f that display the comparison criteria as a function of distance. These examples of graphs include MPH v. Distance 552a, Brake v. Distance 552b, Throttle v. Distance 552c, Steering v. Distance 552d, RPM v. Distance 552e, and Lateral G's v. Distance 552f. Alternative criteria may be provided, and the criteria may be displayed as a function of another correleated dimension, such as time. Alternative types of graphs, such as pie graphs or others can also be provided.

Each graph displays information for the subject driver and the reference on the same set of axes for comparison. Specifically, lines 554a-f depict information for the subject driver, and lines 556a-f for the reference. The data used to plot the subject driver lines is obtained from the previously introduced information (e.g. telemetry data) that has been collected for the driving experience. The data used to plot the reference driver lines may be obtained from various sources including measurements of previously driven laps, averages of such measurements, or hypothetical information. The reference may be another driver that drove with the subject driver simultaneously, a past performance by the subject driver, a performance by a known professional driver, or others.

Preferably, a graphical track image 558 is displayed in one location of the analysis display screen 550, with an indicator 560 that travels along the graphical track image 558 synchronized with data updates in the graphs 552a-f, just as is provided with the driving experience functionality of the seat time segment. Among other things, this allows the viewer to easily observe a location on the track corresponding to notable differences or similarities between the subject driving experience and the reference. Preferably, the graphs include a highlight bar (e.g., 562a-b), which moves along the graphs to display a currently updated location along the reference axis. Specifically, the bar 562a-b or line travels along the reference axis (x-axis, here distance) synchronized to the progression of the indicator 560 along the graphical image of the track. The portion of the graph on one area of the graph (e.g., left) can be displayed in a color that differs from the remaining area of the graph (e.g., right of the line) to further highlight the correlation of the graphs to actual track location. This combination of visual indicators allows a review of the driving experience and comparison to a reference that is tied to the performance on the track in a readily recognizable fashion.

Finally, a playback control allows easy review of and navigation of the driving data. The density bar controls the granularity of the displayed graphical information and the rate bar controls the rate at which the indicator 560 progresses along the track, which allows easier review and comparison to the reference.

Figure 7A:
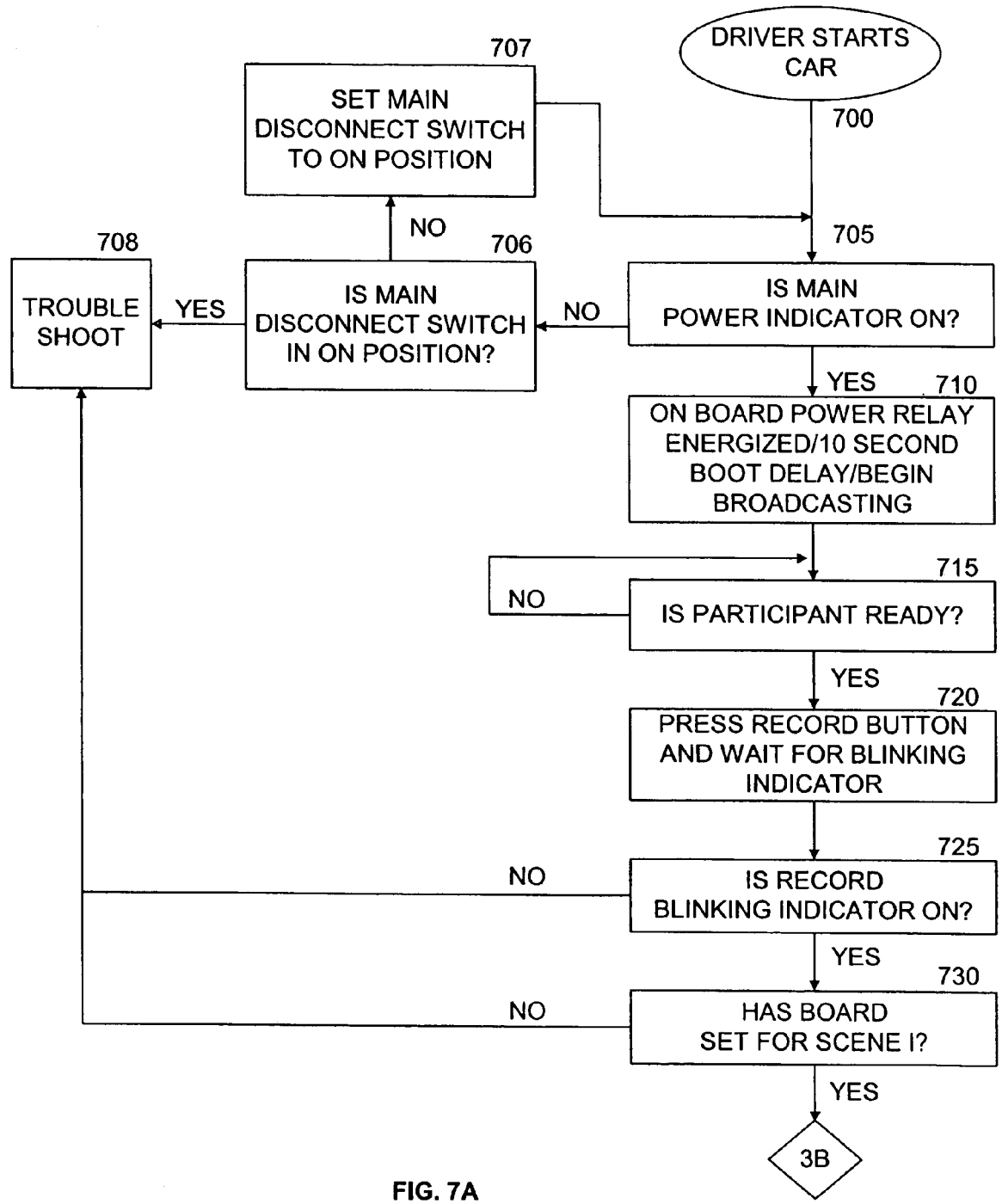
FIGS. 7*a* and 7*b* are flowcharts of a recording method of an experience oriented multimedia racing system according to an embodiment of the present invention.
Figure 7B:
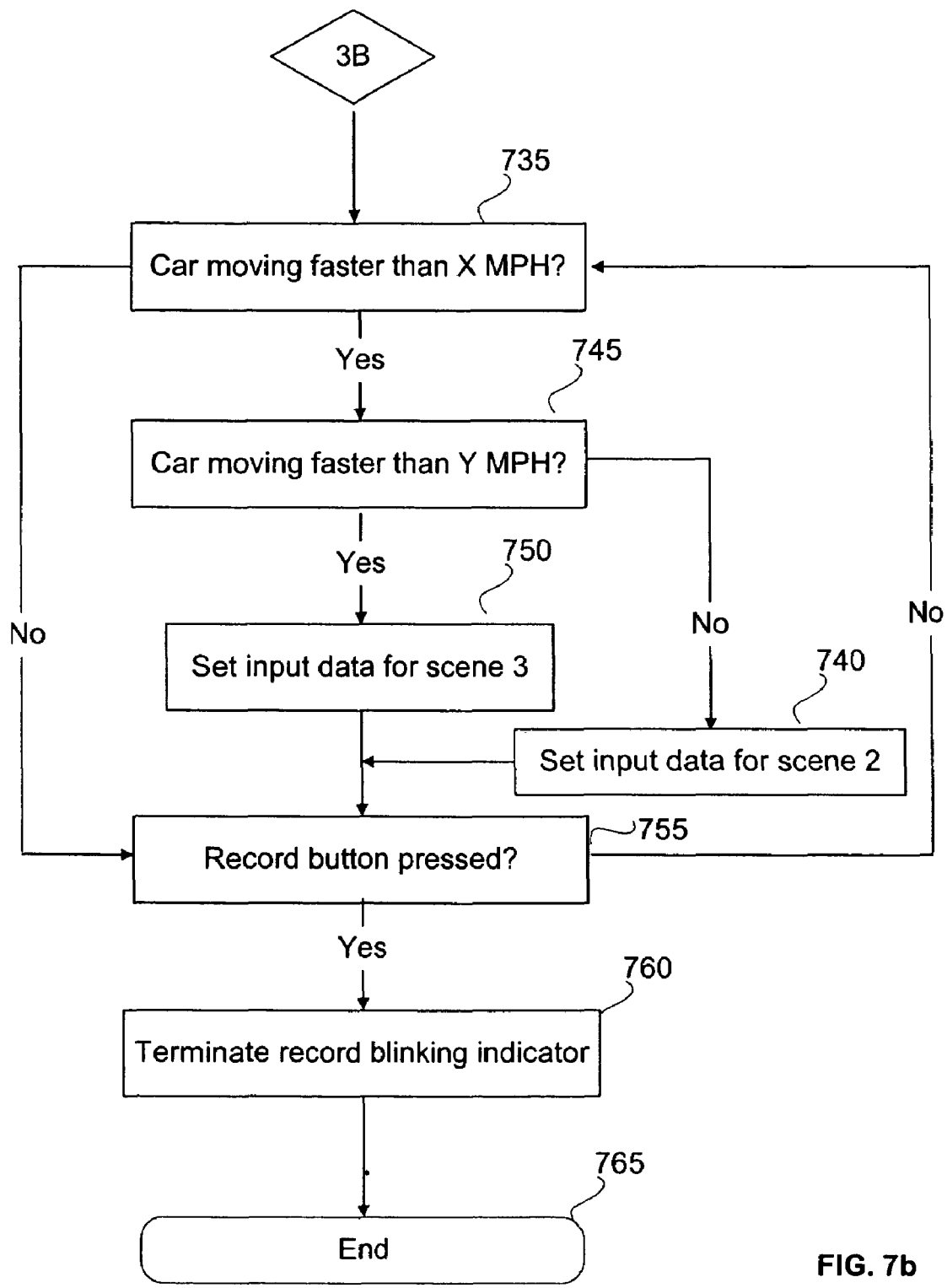

FIGS. 7a and 7b provide a flowchart of the steps involved in recording a tri-media data stream according to an embodiment of the present invention. The process begins when the driver starts the vehicle (700). If the main power indicator is not on (705), the main disconnect switch is checked (706) and activated (707) if necessary, or investigated for further problems (708). Otherwise, the driver waits for the on board systems to power up and become ready for broadcasting (710). After this, once the participant is ready (715), the record button is pressed (720). If the system is working properly (725 and 730), a record indicator will blink and the system will set itself for the first scene or view of the tri-media output. The system will record the input data according to the specifications for the first view until the car reaches a specified speed (735). At this point, the system will identify the parameters for the next scene or view (740) and begin recording the data under this format. Additional speed breakpoints for changing view (745, 750) may be specified, or other telemetry parameters can be used as criteria for changing the output format to a new scene. At the end of the drive, the record button is pressed again (755) to end the recording. This should deactivate the record indicator (760). At this point, the driver can turn off the vehicle (765), which also turns off the tri-media system and ends broadcasting.

It is to be understood that the present invention is not limited to the embodiments described above, but encompasses any and all embodiments within the scope of the following claims.

I claim:

1. A multimedia system for monitoring performance of a vehicle, the system comprising:
   a first on-vehicle camera;
   a first on-vehicle microphone;
   an on-vehicle telemetry device;
   an on-vehicle processing unit that receives input data, corresponding to the vehicle's performance, from the first on-vehicle camera, the first on-vehicle microphone, and the telemetry device, the on-vehicle processing unit configured to multiplex and encode the input data into a multiplexed and encoded data stream; and
   an on-vehicle data transfer unit in communication with the on-vehicle processing unit for transferring the multiplexed and encoded data stream to an external processing unit.

2. The system of claim 1, wherein the first on-vehicle camera further comprises a radio frequency transmitter for communication with the on-vehicle processing unit.

3. The system of claim 1, wherein the first on-vehicle microphone further comprises audio cabling connected to the on-vehicle processing unit for communication with the on-vehicle processing unit.

4. The system of claim 1, wherein the on-vehicle telemetry device comprises a biotelemetry device.

5. The system of claim 4, wherein the on-vehicle biotelemetry device comprises a pulse oximeter connected to said on-vehicle processing unit for communication with the on-vehicle processing unit.

6. The system of claim 1, wherein the on-vehicle telemetry device comprises a wheel-speed indicator.

7. The system of claim 1, further comprising a global positioning system receiver in communication with the on-vehicle processing unit, wherein the on-vehicle processing unit is configured to determine a position of the vehicle based on data communicated from the global positioning system receiver.

8. The system of claim 1, further comprising a plurality of location beacons in operative communication with the on-vehicle processing unit, wherein the on-vehicle processing unit is configured to determine a position of the vehicle based on data communicated from one or more of the location beacons.

9. The system of claim 1, further comprising a remote input in communication with the on-vehicle processing unit, wherein the on-vehicle processing unit is configured to multiplex and encode data communicated from the remote input into the multiplexed and encoded data stream.

10. The system of claim 9, wherein the remote input comprises a video camera that communicates video data to the on-vehicle processing unit.

11. The system of claim 9, wherein the remote input comprises a radio frequency transmitter that communicates one of audio data or video data to the on-vehicle processing unit.

12. The system of claim 1, wherein the on-vehicle processing unit is further configured to select data for inclusion in the multiplexed and encoded data stream based on proximity to a location.

13. The system of claim 1, wherein the on-vehicle processing unit is further configured to select data for inclusion in the multiplexed and encoded data stream based on input from the telemetry device.

14. The system of claim 1, wherein the on-vehicle processing unit is further configured to synchronize the input data that is multiplexed and encoded into the data stream.

15. The system of claim 1, wherein the on-vehicle processing unit is further configured to encode the multiplexed data stream in an MPEG format.

16. The system of claim 1, wherein the on-vehicle data transfer unit comprises a microwave radio frequency transmitter for transferring the multiplexed and encoded data stream.

17. The system of claim 1, wherein the on-vehicle data transfer unit comprises a removable memory device for transferring the multiplexed and encoded data stream.

18. The system of claim 1, further comprising a central kiosk-based processing unit configured to receive the multiplexed and encoded data stream.

19. The system of claim 18, wherein the central-kiosk based processing unit outputs the multiplexed and encoded data stream to a storage medium.

20. The system of claim 19, wherein the storage medium is a DVD disk.

21. The system of claim 18, wherein the central-kiosk based processing unit outputs the multiplexed and encoded data stream to a playback medium.

22. The system of claim 21, wherein the playback medium is a television broadcast.

23. The system of claim 18, wherein the central-kiosk based processing unit comprises a plurality of workstations in communication with a local area network, wherein each of the plurality of workstations receives at least one of a plurality of multiplexed and encoded data streams, each of the plurality of multiplexed and encoded data streams being from a different on-vehicle processing unit.

24. The system of claim 1, wherein the first on-vehicle camera is configured to provide a view from the front of the vehicle.

25. The system of claim 24, further comprising:
a second on-vehicle camera in communication with the on-vehicle processing unit and configured to provide a view from the rear of the vehicle;
a third on-vehicle camera in communication with the on-vehicle processing unit and configured to provide a view of a driver of the vehicle;
a fourth on-vehicle camera in communication with the on-vehicle processing unit and configured to provide a racing-style dependent view; and
a remote camera in communication with the on-vehicle processing unit and configured to provide an exterior view of the vehicle,
wherein the on-vehicle processing unit is configured to multiplex and encode data from the second, third, fourth on-vehicle cameras and the remote camera into the multiplexed and encoded data stream.

26. The system of claim 1, further comprising:
a second on-vehicle microphone in communication with the on-vehicle processing unit; and
a second telemetry device in operative communication with the on-vehicle processing unit,
wherein the on-vehicle processing unit is configured to multiplex and encode data from the second on-vehicle microphone and the second telemetry device into the multiplexed and encoded data stream.

27. The system of claim 1, further comprising:
a second on-vehicle camera;
a second on-vehicle microphone;
a second on-vehicle telemetry device;
a remote input;
a plurality of remote beacon transmitters; and
an on-vehicle beacon receiver configured for communication with one or more of the remote beacon transmitters for determining a current position of the vehicle;
wherein the on-vehicle processing unit is in communication with the second on-vehicle camera, the second on-vehicle microphone input source, the second on-vehicle telemetry input source, the remote input source, and the on-vehicle beacon receiver, the on-vehicle processing unit being configured to select input data provided by the input sources and to multiplex and encode the selected input data into the multiplexed and encoded data stream, and
wherein selection of input data from at least one input source is based on a determined current position of the vehicle.

28. The system of claim 27, wherein selection of input data from at least one input source based on the determined current position of the vehicle comprises selection of data from the remote input.

29. A method of receiving data, corresponding to a vehicle's performance, from a multimedia racing experience system, the method comprising:

receiving, at an on-vehicle processing unit, visual data, audio data and telemetry data, corresponding to a vehicle's performance, from on-vehicle sensors;

multiplexing and encoding into a multiplexed and encoded data streams, at the on-vehicle processing unit, the visual data, the audio data, and the telemetry data; and transferring the multiplexed and encoded data stream to an external processing unit.

30. The method of claim 29, wherein the external processing unit includes a display device.

* * * * *

(12) EX PARTE REEXAMINATION CERTIFICATE (7227th)
United States Patent
Steele

(10) Number: US 7,265,663 C1
(45) Certificate Issued: Dec. 8, 2009

(54) MULTIMEDIA RACING EXPERIENCE SYSTEM

(75) Inventor: Robert C. Steele, Fairfax, VA (US)

(73) Assignee: Trivinci Systems, LLC, Sterling, VA (US)

Reexamination Request:
No. 90/008,970, Dec. 21, 2007

Reexamination Certificate for:
Patent No.: 7,265,663
Issued: Sep. 4, 2007
Appl. No.: 10/278,132
Filed: Oct. 22, 2002

Related U.S. Application Data

(60) Provisional application No. 60/333,499, filed on Nov. 28, 2001.

(51) Int. Cl.
*G08B 1/00* (2006.01)

(52) U.S. Cl. .................. 340/531; 340/426.25; 340/534; 340/539.1; 340/539.12; 701/28; 701/45; 701/46

(58) Field of Classification Search .................. None
See application file for complete search history.

(56) References Cited

U.S. PATENT DOCUMENTS

| | | | |
|---|---|---|---|
| 2,310,202 A | 2/1943 | Alford | |
| 3,949,954 A | 4/1976 | Lipsey | |
| 3,967,278 A | 6/1976 | Buehler et al. | |
| 3,998,550 A | 12/1976 | Konishi et al. | |
| 4,012,739 A | 3/1977 | Hofgen et al. | |
| 4,097,893 A | 6/1978 | Camras | |
| 4,114,155 A | 9/1978 | Raab | |
| 4,817,948 A | 4/1989 | Simonelli | |
| 5,311,197 A | 5/1994 | Sorden | |
| 6,056,237 A | 5/2000 | Woodland | |
| 6,161,066 A * | 12/2000 | Wright et al. | 701/36 |
| 6,319,079 B1 | 11/2001 | Cooper | |
| 7,020,708 B2 | 3/2006 | Nelson et al. | |
| 2003/0055975 A1 * | 3/2003 | Nelson et al. | 709/227 |
| 2003/0086000 A1 * | 5/2003 | Siemens et al. | 348/148 |

OTHER PUBLICATIONS

Image #S69–31171 from the NASA photo gallery (http://history.nasa.gov/alsj/a11/images11.html), captioned "Neil has moved the TV to the end of the cable connecting to the spacecraft and off the simulated lunar surface. In the background, Buzz is working at the MESA. Probably Apr. 15, 1969".*

Apollo 11—Technical Air–to–Ground Voice Transcription: tapes 51 and 66, 1969.*

Peltzer et al, NASA TM–55492, Apollo Unified S–Band System, Apr. 1966, Goddard Space Flight Center, Greenbelt, MD.

Peltzer et al, NASA SP–87, Procedings of the Apollo United–Band Technical Conference, Jul. 14–15, 1965, Goddard Space Flight Center, Greenbelt, MD.

* cited by examiner

*Primary Examiner*—Deandra M Hughes

(57) ABSTRACT

A multimedia racing experience system is provided including a plurality of input devices, such as cameras, microphones, and telemetry sensors. All input devices communicate with an on-vehicle processing unit for multiplexing the input data into a data stream. The data stream is then transferred to a central location for display or recording on playback media.

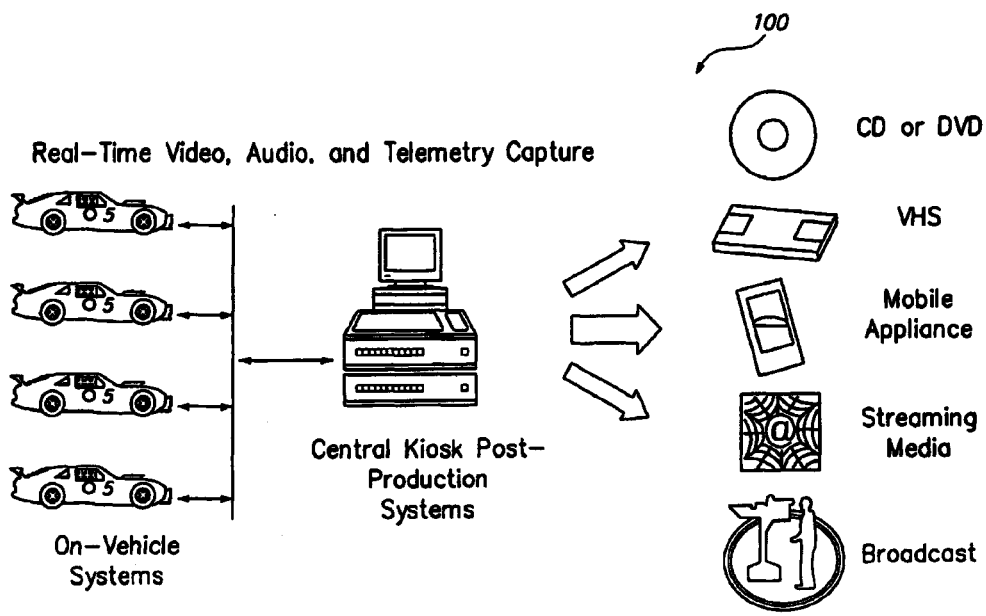

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 27–28 is confirmed.

Claims 1–26 and 29–30 are cancelled.

* * * * *